Aug. 14, 1923.
W. D. HANSON
FISHHOOK
Filed Oct. 29, 1921
1,464,571
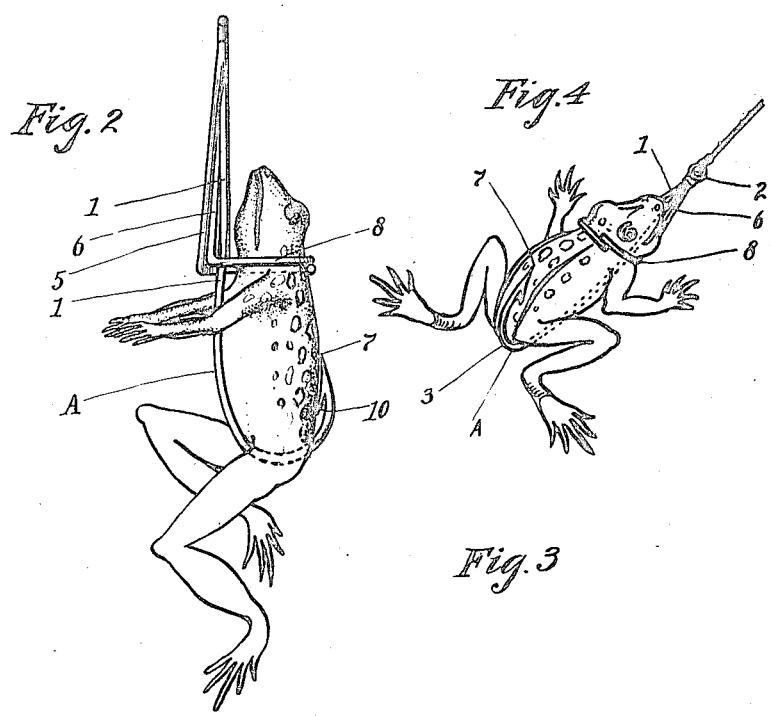
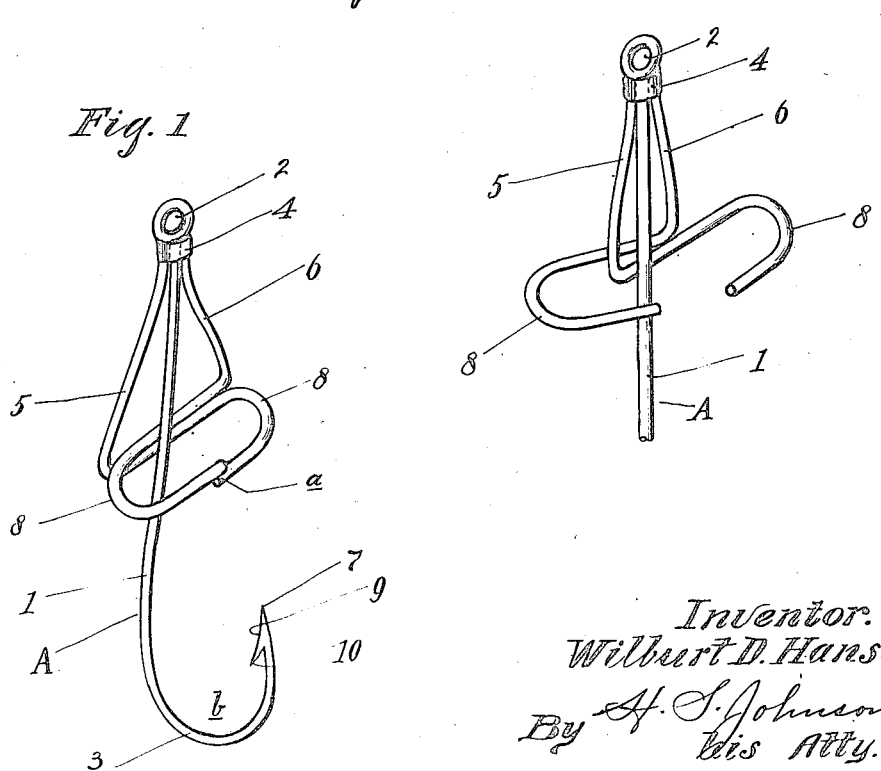
Inventor.
Wilburt D. Hanson
By H. S. Johnson
his Atty.

Patented Aug. 14, 1923.

1,464,571

UNITED STATES PATENT OFFICE.

WILBURT D. HANSON, OF GROVE CITY, MINNESOTA.

FISHHOOK.

Application filed October 29, 1921. Serial No. 511,431.

*To all whom it may concern:*

Be it known that I, WILBURT D. HANSON, a citizen of the United States, residing at Grove City, in the county of Meeker and State of Minnesota, have invented certain new and useful Improvements in Fishhooks, of which the following is a specification.

My invention relates to improvements in fish hooks, and more particularly, to that class of hooks, having provision for holding the bait, without inflicting bodily injury, for the purpose of keeping it alive, a considerable period of time when submerged in the process of fishing.

An object of the invention, is to provide improved means in a fish hook, for holding a live frog, wherein the hook proper forms an important part of the harness, whereby the frog is held safely bound without injury.

It is important, that the bait appear in its natural state, and be bound in a manner to give it bodily freedom to enable it to swim, and that the harness be not cumbersome, and of a nature to not obscure or cover large sections of the bait, as is the case when using disk sinkers, spoons and the like.

My invention contemplates a fish hook of the class described, wherein the hook proper so closely embraces the body of the frog, and without injuring it, that the hook is rendered quite invisible and deceptive when submerged, inasmuch as it closely overlies the speckled back of the frog and resembles a black line in the region of the spine.

The invention consists in the construction, combination and arrangement of parts hereinafter described and claimed.

The accompanying drawings illustrate one form of fish hook embodying my invention, in which, Figure 1 is a perspective view of my improved hook, showing it in its normal, out of use, position.

Figure 2 is a side elevation of Figure 1, showing a frog interlockingly embraced between the hook proper and the hooks of the spring arms.

Figure 3 is a perspective view of the spring arms, showing them sprung inwardly to distend the hooks thereof, and Figure 4 is a perspective view, showing the position of the baited hook submerged.

My improved fish hook comprises an ordinary fishing hook A, consisting of a shank 1, formed at its top with an eye 2, to which the line may be attached said shank having a return bend at its lower end to form a hook 3, said hook opening upwards alongside the shank. Suitably secured to the shank one on either side adjacent the eye thereof, as by means of a surrounding collar 4, or by solder, if desired, are the spring arms 5 and 6, adapted to be pressed under stress, toward each other said arms diverging downward in a plane at right angles to the plane of the hook A. The arms terminate at a point intermediate the eye and the piercing point 7 of the hook, the location of this point varying in hooks designed for holding frogs of different size. At said point, the arms are bent abruptly inward the latter extending laterally preferably behind the shank 1, to the opposite side thereof, at which point it is bent in a wide return, inwardly and terminates, preferably, at a point located slightly beyond said shank, whereby, the terminals of the bent portions are caused to adjacently overlap as at *a*. The bent portions of the arms constitute oppositely disposed, inwardly opening hooks or clamping jaws 8, and, in connection with the arms, may be termed a pair of pinchers suspended from the eye of the hook, and having its jaws disposed horizontally, in a manner, to grasp an elongated object placed longitudinally adjacent the shank 1 of the hook. Further, the jaws are located symmetrically directly over the crotch or bend *b* of the hook, and are suitably spaced upwardly from the piercing point 7 thereof, to enable the jaws to grasp the neck of the frog when the trunk thereof is seated in the crotch of the hook, as is best illustrated in Figures 2 and 4 of the drawings.

In the drawings the inner edge 9 of the spur or barb 10 is shown nearly parallel with the shank, so that it conforms to the curvature of the end of the trunk of the frog whereby the spur is prevented from impaling it.

Thus, the frog is grasped around the neck just above the forelegs, and as the bend of the hook is constructed to extend snugly between the hind legs and up the back, the animal cannot extricate itself, though it is free of limb to swim in its natural way.

In operation, the arms 5 and 6 are grasped between the thumb and fore finger and pressed together, as shown in Figure 3, whereby the jaws are separated to enable the bait to be easily inserted.

It will be noted that by making the jaws overlap at their free ends, the spring arms 5 and 6 may be bent to reduce the opening between the jaws so that a smaller frog may be gripped, which could not be done if the ends of the jaws engaged, thus extending the utility of the device.

It will be noted that the hook describes a line up the back of the bait, and is more or less invisible, while the whole structure is simple, and of small bulk, so that a very small part of the bait is obscured.

Figure 4 best illustrates my improved hook, as it appears in use, there being no movable bulky parts such as locking devices and spinner spoons to arouse suspicion.

I claim:

1. In a bait holder, the combination with a fish hook, of oppositely disposed wire clamping jaws opening toward each other and being located intermediate the ends of the shank of the fish hook in vertical alinement with the bend of the hook of the latter and spaced an appreciable distance above same, and spring arms resiliently connecting said clamping jaws, respectively, to the shank of the fish hook in such a manner as to effect a spreading movement of the clamping jaws in opposition to the tension of the spring arms, the latter being constructed to be manually simultaneously moved toward each other, and to permit the body of a frog to be inserted between them so that it will be gripped solely by the tension of said spring arms when the latter are released.

2. In a bait holder, the combination with a fish hook, of a pair of spring arms secured to the shank of the fish hook and extending outwardly and downwardly therefrom on opposite sides thereof, and a pair of oppositely disposed wire clamping jaws adapted to grip the body of a bait, there being one jaw for each of said spring arms, said jaws opening laterally toward each other and being located intermediate the ends of the shank of the fish hook in vertical alinement with the bend of the hook of the latter, and connections between the jaws and spring arms whereby the jaw on one side of the shank will be connected to the spring arm on the opposite side thereof, for the purpose set forth.

In testimony whereof I affix my signature.

WILBURT D. HANSON.